(12) United States Patent
Jewell et al.

(10) Patent No.: US 10,117,446 B2
(45) Date of Patent: Nov. 6, 2018

(54) HAIRBALL CONTROL THROUGH DIETARY MINERAL LIMITATION

(71) Applicant: Hill's Pet Nutrition, Inc., Topeka, KS (US)

(72) Inventors: Dennis Jewell, Lawrence, KS (US); Luis J. Montelongo, Lawrence, KS (US)

(73) Assignee: Colgate-Palmolive Company, New York, NY (US)

( * ) Notice: Subject to any disclaimer, the term of this patent is extended or adjusted under 35 U.S.C. 154(b) by 97 days.

(21) Appl. No.: 14/441,518

(22) PCT Filed: Nov. 15, 2012

(86) PCT No.: PCT/US2012/065253
§ 371 (c)(1),
(2) Date: May 8, 2015

(87) PCT Pub. No.: WO2014/077815
PCT Pub. Date: May 22, 2014

(65) Prior Publication Data
US 2015/0296841 A1    Oct. 22, 2015

(51) Int. Cl.
| | | |
|---|---|---|
| A23K 20/22 | (2016.01) | |
| A23K 50/40 | (2016.01) | |
| A23K 1/18 | (2006.01) | |
| A23K 20/24 | (2016.01) | |
| A23K 20/26 | (2016.01) | |
| A23K 20/147 | (2016.01) | |
| A23K 20/158 | (2016.01) | |
| A23K 20/163 | (2016.01) | |

(52) U.S. Cl.
CPC ............ *A23K 1/1846* (2013.01); *A23K 20/22* (2016.05); *A23K 20/24* (2016.05); *A23K 20/26* (2016.05); *A23K 50/40* (2016.05); *A23K 20/147* (2016.05); *A23K 20/158* (2016.05); *A23K 20/163* (2016.05); *A23V 2002/00* (2013.01); *A23V 2250/1578* (2013.01); *A23V 2250/1614* (2013.01); *A23V 2250/1618* (2013.01)

(58) Field of Classification Search
CPC ........ A23K 50/40; A23K 50/42; A23K 50/45; A23K 50/48; A23K 50/50; A23K 20/22; A23K 20/24
USPC ...................... 426/2, 805; 424/601, 602, 606
See application file for complete search history.

(56) References Cited

U.S. PATENT DOCUMENTS

| | | |
|---|---|---|
| 5,339,771 A | 8/1994 | Axelrod |
| 5,419,283 A | 5/1995 | Leo |
| 6,001,401 A | 12/1999 | Erasmus et al. |
| 6,080,403 A | 6/2000 | Shields et al. |
| 6,383,529 B2 | 5/2002 | Davenport et al. |
| 6,506,401 B1 | 1/2003 | Rothamel et al. |
| 6,517,877 B2 | 2/2003 | Gannon |
| 6,562,366 B2 | 5/2003 | Cook et al. |
| 6,905,703 B2 | 6/2005 | Rothamel et al. |
| 7,337,708 B2 | 3/2008 | Rothamel et al. |
| 7,425,343 B2 | 9/2008 | Davenport et al. |
| 7,501,137 B2 | 3/2009 | Davenport et al. |
| 8,128,956 B2 | 3/2012 | Torney et al. |
| 9,149,062 B2 | 10/2015 | Friesen et al. |
| 2003/0091668 A1 | 5/2003 | Davenport et al. |
| 2003/0133923 A1 | 7/2003 | Cook et al. |
| 2004/0091518 A1 | 5/2004 | Welser |
| 2005/0079205 A1* | 4/2005 | Miller ................. A23K 20/105 424/442 |
| 2005/0085443 A1 | 4/2005 | Chinachoti et al. |
| 2005/0106220 A1 | 5/2005 | Inagawa et al. |
| 2007/0202211 A1* | 8/2007 | Altom .................... A23K 40/20 426/2 |
| 2008/0293621 A1* | 11/2008 | Allen ..................... A23K 50/40 514/1.1 |
| 2009/0197804 A1* | 8/2009 | Friesen .................. A23L 1/304 514/1.1 |

FOREIGN PATENT DOCUMENTS

| | | |
|---|---|---|
| CN | 101031309 | 9/2007 |
| CN | 101795577 | 8/2010 |
| CN | 101917868 | 12/2010 |
| RU | 2412608 | 2/2011 |
| WO | WO 01/050881 | 7/2001 |
| WO | WO 2006/119049 | 11/2006 |
| WO | WO2007/028636 | 1/2007 |
| WO | WO 2007/096838 | 8/2007 |
| WO | WO 2008148873 A2 * | 12/2008 ........... A61K 31/401 |

OTHER PUBLICATIONS

AAFCO, Dog and Cat food Nutrient Profiles, American Feed Control Officials Inc., Official Publication, 2003, p. 126-140.*
Armstrong et al., Max's House, Feline Nutrition Key Nutritional Factors, published Apr. 23, 2003; available at: https://web.archive.org/web/20030423083731/http://maxshouse.com/Clinical_Nutrition/key_nutritional_factors.htm; accessed on Apr. 7, 2017.*
Nutrient Requirements of Dogs, National Academy Press, 1985, p. 15-16.*
Nash, Sodium & Chloride Requirements; accessed on Apr. 14, 2017; published on Mar. 7, 2009; available at: https://web.archive.org/web/20090307032944/http://peteducation.com/article.cfm?c=2+1659&aid=652.*

(Continued)

*Primary Examiner* — Walter A Moore

(57) ABSTRACT

The present invention relates to methods for controlling hairball formation in animals, particularly for treating and/or preventing hairball formation, elimination, and/or discharge by companion animals, including cats and dogs, by limitation of dietary minerals. The methods comprise feeding the animals in need of such treatment compositions comprising from 0.60% to 0.74% calcium by dry weight of the composition; from 0.50% to 0.69% phosphorous by dry weight of the composition; and from 0.06% to 0.28% sodium by dry weight of the composition, in an amount and for a time sufficient for treatment and/or prevention of hairball formation in the animal.

7 Claims, No Drawings

(56) References Cited

OTHER PUBLICATIONS

AAFCO, 2003, American Association of Feed Control Officials Official Publication, p. 220.
Anonymous, 2012, "Purina Veterinary Diets NF; Kidney Function Feline Formula Dry," http://web.archive.org/web/20120106100102/http://www.nationalpetpharmacy.com/Product/5814/Purina-Veterinary-Diets--NF-Kidney-Function-Feline-Formula-Dry#.
Anti et al., 2004, "Effects of mineral-water supplementation on gastric emptying of solids in patients with functional dyspepsia assessed with the 13C-octanoic-acid breath test," Hepatogastroenterology 60:1856-1859.
International Search Report and Written Opinion in International Application No. PCT/US2012/065253, dated Aug. 22, 2013.
Lewis et al., 2012, "Adverse events from calcium supplementation: relationship to errors in myocardial infarction self-reporting in randomized controlled trials of calcium supplementation," J. Bone Miner Res. 27(3):719-722.
Saunders et al., 1988, "Effect of calcium carbonate and aluminum hydroxide on human intestinal function." Dig Dis Sci. 33(4):409-413.
Tytgat et al., 2003, "Contemporary understanding and management of reflux and constipation in the general population and pregnancy: a consensus meeting," Alimentary Pharmacology & Therapeutics 18:291-101.
Written Opinion of the International Preliminary Examining Authority in International Application PCT/US2012/065253, dated Dec. 17, 2014.
AAFCO, Drs. Foster and Smith Educational Staff, 2008, "Cat Food Standards by the AAFCO," "Dog Food Standards by the AAFCO".

\* cited by examiner

HAIRBALL CONTROL THROUGH DIETARY MINERAL LIMITATION

FIELD OF THE INVENTION

The present disclosure relates to methods for treatment and/or prevention of gastrointestinal bezoars ("hairballs") in animals, to compositions for use in those methods, and to processes for the preparation of such compositions. In particular, the present disclosure relates to methods and compositions for the treatment and/or prevention of hairballs in companion animals, e.g., cats and dogs.

BACKGROUND OF THE INVENTION

Bezoars are any of several types of solid or semi-solid masses of indigestible material found in the stomach of humans and many animals including cattle, cats, rats, rabbits, and non-primates. Trichobezoars, which contain a mesh of ingested hair, are known to entrap undigested dietary fat in the hair mesh. The terms bezoars, trichobezoars, and hairballs will be used interchangeably throughout this application. While the incidence of bezoars is generally very low in humans, a somewhat greater risk exists among mentally or emotionally challenged children, particularly humans who habitually pluck their hair (trichotillomania) and/or eat their hair (trichopagia).

Animals that constantly groom themselves, such as cats and rabbits, regularly ingest large quantities of hair. Normally, the ingested hair passes through the gastrointestinal tract of the animal and is excreted in the feces. However, the ingestion of large quantities of hair may cause the hair to accumulate in the stomach and form a hairball or trichobezoar. A hairball is typically composed of hair, mucous, water, food particles and mineral salts. Any ingested hair that is not digested or does not otherwise pass down the digestive tract may accumulate in the stomach and form an over hairball. The most common physiological consequences thereof are diarrhea and vomiting. A hairball can be harmful to the animal if it impedes the normal digestive process by blocking the pylorus and preventing the passage of digesta down the gastrointestinal tract. More frequently, hairballs are nothing more than a nuisance to the animal and its owner. For example, the cat will attempt to eliminate the hairball from the stomach through the vomiting reflex. A hairball may produce constipation and defecation difficulties if it passes from the stomach and becomes lodged in the lower bowel.

Approaches to the treatment of hairballs have included administration of compositions and foods comprising fiber supplements, fat emulsifiers, lubricants, malt syrup emulsion, mineral oil, petrolatum, and proteolytic enzymes (bromelain). However, there remains a need for methods and compositions for the treatment and/or prevention of hairballs in mammals in need thereof and, in particular, there remains a need for methods and compositions for the treatment and/or prevention of hairballs in non-human animals, including companion animals, e.g., cats and dogs.

BRIEF SUMMARY OF THE INVENTION

The present invention is directed to a method for treatment and/or prevention of hairball formation in an animal in need thereof, which comprises feeding the animal a composition comprising less than or equal to 0.74% calcium by dry weight of the composition; less than or equal to 0.69% phosphorous by dry weight of the composition; and less than or equal to 0.28% sodium by dry weight of the composition. According to this method, the composition is administered in an amount and for a time sufficient for treatment and/or prevention of hairball formation in and/or hairball elimination by the animal.

In one embodiment, the animal in need thereof is a cat.

In another embodiment, the animal in need thereof is a dog.

In still another embodiment, the animal in need thereof is a rabbit.

The present invention is further directed to a food composition comprising from 5% to 75% protein by dry weight of the composition; from 5% to 50% fat by dry weight of the composition; from 5% to 75% carbohydrate by weight of the composition; less than or equal to 0.74% calcium by dry weight of the composition; less than or equal to 0.69% phosphorous by dry weight of the composition; less than or equal to 0.28% sodium by dry weight of the composition; wherein the food composition is suitable for consumption by an animal, the food composition is effective for treatment and/or prevention of hairball formation in the animal.

The present invention is still further directed to a method for preparing a food product, comprising admixing suitable sources of protein, fat, carbohydrate, minerals, and vitamins; and processing the mixture to provide the food product, which food product is suitable for consumption by a companion animal; and comprises less than or equal to 0.74% calcium by dry weight of the composition, less than or equal to 0.69% phosphorous by dry weight of the composition, and less than or equal to 0.28% sodium by dry weight of the composition. In a specific embodiment, the food composition prepared according to the invention also comprises 5% to 75% protein by dry weight of the composition; from 5% to 50% fat by dry weight of the composition; from 5% to 75% carbohydrate by weight of the composition.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

DETAILED DESCRIPTION OF THE INVENTION

The following description of the preferred embodiment(s) is merely exemplary in nature and is in no way intended to limit the invention, its application, or uses.

Unless otherwise specified, all percentages and amounts expressed herein and elsewhere in the specification should be understood to refer to percentages by weight. The amounts given are based on the active weight of the material. As used throughout, ranges are used as shorthand for describing each and every value that is within the range. Any value within the range can be selected as the terminus of the range. In addition, all references cited herein are hereby incorporated by referenced in their entireties. In the event of a conflict in a definition in the present disclosure and that of a cited reference, the present disclosure controls.

Definitions

It is contemplated that the invention described herein is not limited to the particular methodology, protocols, ingredients and reagents described, as these may vary. It is also to be understood that the terminology used herein is for the purpose of describing particular embodiments only, and is not intended to limit the scope of the present invention in any way.

Unless defined otherwise, all technical and scientific terms used herein have the same meanings as commonly understood by one of ordinary skill in the art to which this invention belongs. Although any methods and materials similar or equivalent to those described herein can be used in the practice or testing of the present invention, the preferred methods, devices and materials are now described. All publications mentioned herein are incorporated by reference for the purpose of describing and disclosing the materials and methodologies that are reported in the publication, which might be used in connection with the invention.

As used herein and in the appended claims, the singular forms "a", "an", and "the" include plural reference unless the context clearly dictates otherwise.

As used herein, the term "animal" is a human, a non-human animal, or a non-human mammal, where the term non-human animal includes non-human primates (e.g., monkeys, chimpanzees, apes etc.), companions animals and house pet (dogs, cats, rabbits etc.), laboratory animals, domesticated animals, livestock and farm animals (e.g., horses, goats, sheep, swine, llamas, alpacas, bovine animals etc.). In one embodiment, the animal is a non-primate mammal. In another embodiment, the animal is a non-human primate. In a more specific embodiment, the animal is a domesticated companion animal or "house" pet, such as a female feline or female canine.

According to the invention, the phrase "animal in need thereof," refers to a human or a non-human animal for whom or for which treatment, prevention, or control of hairball formation and/or hairball elimination is indicated. Such animals include those known to be currently afflicted with hairball formation and those known to have been afflicted with hairball formation in the past, as well as those expected to be or are at risk of being afflicted with hairball formation based on, inter alia, a tendency or habit of consuming hair, e.g., by animals that groom themselves or others by licking their fur, or animals afflicted with trichophagia, trichotillomania or pica. The accumulation of groomed hair in the stomach of such animals, e.g., cats, rabbits, dogs and other animals that groom themselves, predisposes the animal to coughing up trichobezoars ("hairballs"). In severe cases, it may lead to blockage of the gastrointestinal tract.

The term "preventing," as used herein, means e.g., to completely or almost completely stop as well as to substantially reduce hairball formation, elimination, and or discharge (e.g., by coughing up, vomiting and/or diarrhea) by the animal in need thereof.

The term "treating," as used herein, means to cure, inhibit, arrest the development, relieve the symptoms or effects of, ameliorating, or cause the reduction of hairball formation, discharge, and/or elimination by the animal in need of the claimed treatment.

Accordingly, it should be recognized that the terms "preventing," "treating," and "controlling," are not intended to limit the scope of the invention and that there can be overlap amongst these terms.

The term "cat" includes those cats which are companion animals known as domestic cats or house cats, or *Felis domesticus*. The term cat is synonymous with the term feline.

The term "companion animal" used in the present invention includes any non-human animal suitable for being kept as a pet by humans including a dog, a cat, and a rodent. All aspects of the present invention are preferably for the treatment of cats and/or dogs.

The term "dog" includes those dogs which are companion animals such as *Canis familiaris*, working dogs and the like. The term dog is synonymous with the term canine.

As used herein, "an amount effective", "an effective amount", and like terms refer to that amount of a material or composition as described herein that may be effective to achieve a particular biological result, i.e., hairball control. In specific embodiments, administration of an effective amount of a composition of the invention will be for a time sufficient to prevent and/or reduce hairballs in the animal treated. In a particular embodiment, the method comprises administration and consumption of a composition of the invention for a period of time sufficient to result in reduction in the frequency of hairball elimination by the animal to an acceptable level; i.e., to a level acceptable to the patient or, where the patient is an a non-human animal, to a level acceptable to the owner of that non-human animal. An effective amount may be based on several factors, including an animal's ideal weight, the age, gender, and activity of the animal, the metabolizable energy of the composition, and the frequency of feeding the compositions of the present invention, e.g., once, twice, or three times daily, and other compositions fed to the animal.

A "food" for "food composition" or pet food composition can, in some embodiments of the invention, be a nutritionally complete diet for the intended recipient animal (e.g., a companion animal, such as a domestic cat or domestic dog).

As used herein, an "ingredient" refers to any component of a composition.

The term "nutrient" refers to a substance that provides nourishment. In some cases an ingredient may comprise more than one "nutrient," for example, a composition may comprise corn comprising important nutrients including both protein and carbohydrate.

As contemplated herein, the compositions of the present invention are meant to encompass, but not be limited to, nutritionally-complete and balanced animal food compositions. A "nutritionally complete diet" is a diet that includes sufficient nutrients for maintenance of normal health of a healthy animal on the diet. Nutritionally complete and balanced pet food compositions, e.g. for companion felines and canines, are familiar to one of skill in the art. For example substances such as nutrients and ingredients suitable for nutritionally complete and balanced animal feed compositions, and recommended amounts thereof, may be found for example, in the Official Publication of the Association of American Feed Control Officials, Inc. (AAFCO), Atlanta, Ga., (2005).

As used herein, the term "supplement(s)" include, but are not limited to, a feed used with another feed to improve nutritive balance or performance of the total diet for an animal. Supplements include, but are not limited to, compositions that are fed undiluted as a supplement to other feeds, offered free choice with other parts of an animal's ration that are separately available, or diluted and mixed with an animal's regular feed to produce a complete feed. The AAFCO guidelines, for example, contain a discussion relating to supplements in the Official Publication of the Association of American Feed Control Officials, Inc. (AAFCO), Atlanta, Ga. (2005). Supplements may be in various forms including, for example, powders, liquids, syrups, pills, encapsulated compositions and the like.

Methods of the Invention

The present invention is directed to methods for the treatment and/or prevention of hairball formation in an animal in need thereof, comprising feeding the animal a composition comprising limited concentrations of three ingredients, calcium, phosphorous, and sodium. In particular, the compositions comprise less than or equal to 0.74% calcium by dry weight of the composition, less than or equal to 0.69% phosphorous by dry weight of the composition, and less than or equal to 0.28% sodium by dry weight of the composition;

These compositions, exemplified by those described below in greater detail, are administered in an amount and for a time sufficient for treatment and/or prevention of hairball formation in the animal.

In a particular aspect of this embodiment, the composition administered for treatment and/or prevention of hairball formation comprises from 0.1%, from 0.2%, from 0.3%, from 0.4%, from 0.5%, or from 0.6% to less than or equal to 0.74% calcium by dry weight of the composition. The administered compositions, according to these embodiments, further comprise less than or equal to 0.69% phosphorous by dry weight of the composition. In various aspects of these embodiments the administered composition may comprise from 0.1%, from 0.2%, from 0.3%, from 0.4%, from 0.5%, or from 0.6% to less than or equal to 0.69% phosphorous by dry weight of the composition. The administered compositions, according to these embodiments, further comprise less than or equal to 0.28% sodium by dry weight of the composition. In various aspects of these embodiments the administered composition may comprise from 0.05%, from 0.10%, from 0.15%, from 0.2%, of from 0.25% to less than or equal to 0.28% sodium by dry weight of the composition. According to these embodiments, the compositions are administered in an amount and for a time sufficient for treatment of hairball formation in the animal.

In another embodiment, the methods of the present invention are directed to a method for the treatment and/or prevention of hairball formation in an animal in need thereof comprising administration of a composition of the present invention, which compositions comprise 0.74% calcium by dry weight of the composition, 0.69% phosphorous by dry weight of the composition, and 0.28% sodium by dry weight of the composition, wherein those compositions are administered in an amount and for a time sufficient for treatment and/or prevention of hairball formation in the animal.

In a specific embodiment, the methods of the present invention are directed to a method for the treatment of hairball formation in an animal in need thereof comprising administration of a composition of the present invention, which compositions comprise less than or equal to 0.74% calcium by dry weight of the composition, less than or equal to 0.69% phosphorous by dry weight of the composition, and less than or equal to 0.28% sodium by dry weight of the composition, wherein those compositions are administered in an amount and for a time sufficient for treatment of hairball formation in the animal.

In particular aspects of this embodiment, the compositions administered for treatment of hairball formation comprise from 0.1%, from 0.2%, from 0.3%, from 0.4%, from 0.5%, or from 0.6% to less than or equal to 0.74% calcium by dry weight of the composition. The administered compositions, according to these embodiments, further comprise less than or equal to 0.69% phosphorous by dry weight of the composition. In various aspects of these embodiments the administered composition may comprise from 0.1%, from 0.2%, from 0.3%, from 0.4%, from 0.5%, or from 0.6% to less than or equal to 0.69% phosphorous by dry weight of the composition. The administered compositions, according to these embodiments, further comprise less than or equal to 0.28% sodium by dry weight of the composition. In various aspects of these embodiments the administered composition may comprise from 0.05%, from 0.10%, from 0.15%, from 0.2%, of from 0.25% to less than or equal to 0.28% sodium by dry weight of the composition. According to these embodiments, the compositions are administered in an amount and for a time sufficient for treatment of hairball formation in the animal.

In a specific embodiment, the methods of the present invention are directed to a method for the treatment of hairball formation in an animal in need thereof comprising administration of a composition of the present invention, which compositions comprise 0.74% calcium by dry weight of the composition, 0.69% phosphorous by dry weight of the composition, and 0.28% sodium by dry weight of the composition, wherein those compositions are administered in an amount and for a time sufficient for treatment and/or prevention of hairball formation in the animal.

In another specific embodiment, the methods of the present invention are directed to a method for the prevention of hairball formation in an animal in need thereof comprising administration of a composition of the present invention, which compositions comprise less than or equal to 0.74% calcium by dry weight of the composition, less than or equal to 0.69% phosphorous by dry weight of the composition, and less than or equal to 0.28% sodium by dry weight of the composition, wherein those compositions are administered in an amount and for a time sufficient for prevention of hairball formation in the animal.

In another embodiment, the methods of the present invention are directed to a method for the prevention of hairball formation in an animal in need thereof comprising administration of compositions of the present invention, which compositions comprise from 0.1%, from 0.2%, from 0.3%, from 0.4%, from 0.5%, or from 0.6% to less than or equal to 0.74% calcium by dry weight of the composition. The administered compositions, according to these embodiments, further comprise less than or equal to 0.69% phosphorous by dry weight of the composition. In various aspects of these embodiments the administered composition may comprise from 0.1%, from 0.2%, from 0.3%, from 0.4%, from 0.5%, or from 0.6% to less than or equal to 0.69% phosphorous by dry weight of the composition. The administered compositions, according to these embodiments, further comprise less than or equal to 0.28% sodium by dry weight of the composition. In various aspects of these embodiments the administered composition may comprise from 0.05%, from 0.10%, from 0.15%, from 0.2%, of from 0.25% to less than or equal to 0.28% sodium by dry weight of the composition. According to these embodiments, the compositions are administered in an amount and for a time sufficient for prevention of hairball formation in the animal.

In still another specific embodiment, the methods of the present invention are directed to a method for the prevention of hairball formation in an animal in need thereof comprising administration of a composition of the present invention, which compositions comprise 0.74% calcium by dry weight of the composition, 0.69% phosphorous by dry weight of the composition, and 0.28% sodium by dry weight of the composition, wherein those compositions are administered in an amount and for a time sufficient for prevention of hairball formation in the animal.

The term "treatment of hairball formation" in an animal in need thereof, as used herein, encompasses reducing or controlling the frequency of hairball discharge or elimination by the treated animal and/or reducing or controlling the size of hairballs discharged or eliminated by the animal. That is, as used herein, the phrases "treatment of hairball formation" and "prevention of hairball formation" refer to and encompass reduction in the frequency or the size or both the frequency and size of hairball elimination from the treated animal.

The terms treat and treating therefore, encompass any such indication of success in the treatment or amelioration of hairball production by the treated animal in need thereof. In the context of the present invention, treatment and/or prevention therefore encompasses both therapeutic and prophylactic treatment of hairball discharge by an animal in need thereof. The claimed methods therefore may involve complete or partial eradication of the hairball production, discharge, and elimination by the animal, including cessation, amelioration, or arresting subsequent development hairball formation and/or discharge, and/or prevention of, or reduction of risk of, subsequent occurrence of hairball formation and/or discharge by the treated animal.

According to the claimed methods, the compositions of the invention are orally administered to the animal in need of treatment or prevention of hairballs formation and/or discharge or elimination of hairballs. The compositions are administered typically at least once weekly, at least three times a week or at least once a day. In certain embodiments the compositions are provided ad libitum to the animal in need of the claimed treatment. The compositions are administered a time sufficient for elimination or reduction of hairball formation and/or elimination to an acceptable frequency.

Compositions of the Invention

Compositions of the present invention include food compositions comprising from 5% to 75% protein by dry weight of the composition, from 5% to 50% fat by dry weight of the composition, from 5% to 75% carbohydrate by weight of the composition, less than or equal to 0.74% calcium by dry weight of the composition, less than or equal to 0.69% phosphorous by dry weight of the composition, and less than or equal to 0.28% sodium by dry weight of the composition, wherein the food composition is suitable for consumption by an animal, and wherein the composition is effective for treatment and/or prevention of hairball formation in the animal.

In preparing a composition of the present invention, the components of the composition are adjusted so as to contain less than or equal to 0.74% calcium, less than or equal to 0.69% phosphorous, and less than or equal to 0.28% sodium, each by dry weight of the composition.

In particular embodiments of the present invention, the components of the composition are adjusted so as to contain from 0.1%, from 0.2%, from 0.3%, from 0.4%, from 0.5%, or from 0.6% to less than or equal to 0.74% calcium by dry weight of the composition; from 0.1%, from 0.2%, from 0.3%, from 0.4%, from 0.5%, or from 0.6% to less than or equal to 0.69% phosphorous by dry weight of the composition, and from 0.05%, from 0.10%, from 0.15%, from 0.2%, of from 0.25% to less than or equal to 0.28% sodium by dry weight of the composition.

The sources of calcium, phosphorous, and sodium may, for example, be incorporated into the composition during the processing of the formulation, such as during and/or after mixing of other components of the composition. The compositions to be administered according to the methods of the invention may be formulated as an animal food composition that, in certain embodiments, is a nutritionally-balanced and/or nutritionally-complete animal food product or diet. In other embodiments, the composition is formulated and prepared as a nutritional supplement, a treat, or a toy.

For example, a nutritionally complete and balanced cat food composition of the present invention may comprise: from 0 to 90%, from 5% to 75%, from 10% to 60% protein, and from 15% to 50% by weight of protein; from 0% 75%, from 2% to 60%, and from 5% 50% by weight of carbohydrate; from 2% to 60%, from 5% to 50%, and from 10% to 35% by weight of fat. The compositions may further contain from 0 to 15%, or from 2% to 8%, by weight of vitamins (e.g., vitamin E) and minerals, antioxidants, and other nutrients, e.g. amino acids (e.g., methionine, DL-methionine, and L-methionine) and antioxidants, which support the nutritional needs of the animal. These compositions of the invention less than or equal to 0.74% calcium, less than or equal to 0.69% phosphorous, and less than or equal to 0.28% sodium, each by dry weight of the composition.

The composition of these nutritionally complete cat food formulations may be adjusted to so as to contain from 0.1%, from 0.2%, from 0.3%, from 0.4%, from 0.5%, or from 0.6% to less than or equal to 0.74% calcium by dry weight of the composition; from 0.1%, from 0.2%, from 0.3%, from 0.4%, from 0.5%, or from 0.6% to less than or equal to 0.69% phosphorous by dry weight of the composition, and from 0.05%, from 0.10%, from 0.15%, from 0.2%, of from 0.25% to less than or equal to 0.28% sodium by dry weight of the composition.

For example, a nutritionally complete and balanced dog food composition of the present invention may comprise: from 0 to 90%, from 5% to 75%, from 10% to 60% protein, and from 15% to 50% by weight of protein; from 0% 90%, from 2% to 80%, from 5% 75%, and from 10% to 50% by weight of carbohydrate; from 2% to 60%, from 5% to 50%, and from 10% to 35% by weight of fat. The compositions may further contain from 0 to 15%, or from 2% to 8%, by weight of vitamins and minerals, antioxidants, and other nutrients which support the nutritional needs of the animal. These compositions of the invention contain less than or equal to 0.74% calcium, less than or equal to 0.69% phosphorous, and less than or equal to 0.28% sodium, each by dry weight of the composition.

The composition of these nutritionally-complete dog food formulations may be adjusted to so as to contain from 0.1%, from 0.2%, from 0.3%, from 0.4%, from 0.5%, or from 0.6% to less than or equal to 0.74% calcium by dry weight of the composition; from 0.1%, from 0.2%, from 0.3%, from 0.4%, from 0.5%, or from 0.6% to less than or equal to 0.69% phosphorous by dry weight of the composition, and from 0.05%, from 0.10%, from 0.15%, from 0.2%, of from 0.25% to less than or equal to 0.28% sodium by dry weight of the composition.

In formulating the compositions of the present invention, particularly where the compositions are to be prepared as nutritionally-complete and nutritionally-balanced diets or as components, thereof, those compositions should consider the suggested minimum dietary requirements for various dietary components, including, e.g., calcium, phosphorous, and sodium, of the animal in need of treatment and/or prevention of hairball formation. The suggested minima of the ranges of calcium, phosphorous, and sodium are known to those of ordinary skill in the art or are readily determined from standard sources, e.g., from the AAFCO guidelines cite above, and the like. For example, for a cat, the compositions may contain, in certain embodiments, a minimum of 0.6% calcium, 0.5% phosphorous and 0.06% sodium.

Sources of proteins, carbohydrates, fats, vitamins, minerals, balancing agents, and the like, suitable for inclusion in the compositions of the invention, and particularly in the food products of the invention to be administered in the claimed methods, may be selected from among those conventional materials known to those of ordinary skill in the art.

Proteins useful as ingredients of the food compositions of the present invention may be from any source, including, for example, proteins from animal sources, such as meat protein isolate, whey protein isolate, mixtures thereof, and the like, as well as vegetable sources, such as soy protein isolate, corn, corn gluten meal, wheat gluten, mixtures thereof, and the like. Additional sources of protein may include one or more of the following: animal proteins, including mammalian, avian protein, reptilian, amphibian, fish, invertebrate proteins and combinations thereof; e.g. from any of cattle, sheep, pig, goat, deer, rabbit, horse, kangaroo, their milk, curds, whey or blood, and internal tissues and organs such as smooth muscle, striate muscle, liver, kidney, intestine or heart; avian protein sources encompass chicken, chicken by-products, turkey, goose, duck, ostrich, quail, pigeon, their eggs and internal tissues and organs such as smooth muscle, striate muscle, liver, kidney, intestine or heart; amphibian sources include frog or salamander, reptilian protein sources include alligator, lizard, turtle and snake; a fish protein sources include catfish, herring, salmon, tuna, bluefish, cod, halibut, trout, swordfish and their eggs; and an invertebrate protein sources include lobster, crab, clams, mussels or oysters, and combinations thereof The carbohydrate component of compositions of the present invention may be from any source, and may enter the food composition as part of another ingredient, such as the protein source. In certain embodiments, carbohydrates useful as ingredients of the food compositions of the present invention include polysaccharides (e.g., starches and dextrins) and sugars (e.g., sucrose, lactose, maltose, glucose, and fructose) that are metabolized for energy when hydrolyzed. Examples of carbohydrate sources suitable for inclusion in the compositions disclosed herein include, but are not limited to, corn, whole yellow corn, brewers rice, corn gluten meal, grain sorghum, wheat, barley, and rice.

Fats useful as ingredients of the food compositions of the present invention may be from any source, such as but not limited to poultry fat, beef tallow, lard, choice white grease, soybean oil, corn oil, canola oil, sunflower oil, mixtures thereof, and the like. The fat may be incorporated completely within the food composition, deposited on the outside of the food composition, or a mixture of the two methods.

In one embodiment, the composition to be administered in the claimed methods is formulated and prepared as a supplement. Supplements include, for example, a food product, feed, or pet food, that can be used with another food product, feed, or pet food composition to improve the nutritive balance or performance of the total. Contemplated supplements include compositions that are fed undiluted as a supplement to other feeds or pet foods, offered free choice with other parts of an animal's ration that are separately available, or diluted and mixed with an animal's regular feed or pet food to produce a complete feed or pet food. The AAFCO, for example, has provided a discussion relating to supplements in the American Feed Control Officials, Incorp. Official Publication (2003), at page 220. Supplements may be in various forms including, for example, powders, liquids, syrups, pills, encapsulated compositions, etc.

In another embodiment, treats of the present invention can be prepared by, for example, an extrusion or baking process similar to those described above for dry food to provide an edible product comprising less than or equal to 0.74% calcium, less than or equal to 0.69% phosphorous, and less than or equal to 0.28% sodium, each by dry weight of the treat. Treats include, for example, compositions that are given to an animal to entice the animal to eat during a non-meal time. Treats may be nutritional, wherein the composition comprises one or more nutrients, and may, for example, have a composition as described above for food. Non-nutritional treats encompass any other treats that are non-toxic. Compositions of the invention can be coated onto the treat, incorporated into the treat, or both. Again, formulation of treats may be adjusted to contain from 0.1%, from 0.2%, from 0.3%, from 0.4%, from 0.5%, or from 0.6% to less than or equal to 0.74% calcium by dry weight of the composition; from 0.1%, from 0.2%, from 0.3%, from 0.4%, from 0.5%, or from 0.6% to less than or equal to 0.69% phosphorous by dry weight of the composition, and from 0.05%, from 0.10%, from 0.15%, from 0.2%, of from 0.25% to less than or equal to 0.28% sodium by dry weight of the composition.

In another embodiment, the animal toy is a chewable or consumable toy, that is typically prepared by coating any existing toy with a formulation that provides less than or equal to 0.74% calcium, less than or equal to 0.69% phosphorous, and less than or equal to 0.28% sodium, each by dry weight of the toy. Toys therefore include, for example, chewable toys. Contemplated toys for dogs include, for example, artificial bones. In certain embodiments, the composition can form a coating on the surface of the toy or on the surface of a component of the toy, or it can be incorporated partially or fully throughout the toy, or both, to provide less than or equal to 0.74% calcium, less than or equal to 0.69% phosphorous, and less than or equal to 0.28% sodium, each by dry weight of the toy. The toys of the invention, in certain embodiments, may be formulated so as to contain from 0.1%, from 0.2%, from 0.3%, from 0.4%, from 0.5%, or from 0.6% to less than or equal to 0.74% calcium by dry weight of the composition; from 0.1%, from 0.2%, from 0.3%, from 0.4%, from 0.5%, or from 0.6% to less than or equal to 0.69% phosphorous by dry weight of the composition, and from 0.05%, from 0.10%, from 0.15%, from 0.2%, of from 0.25% to less than or equal to 0.28% sodium by dry weight of the composition.

A wide range of suitable toys are currently marketed. See, e.g., U.S. Pat. No. 5,339,771 (and references disclosed in U.S. Pat. No. 5,339,771). See also, e.g., U.S. Pat. No. 5,419,283 (and references disclosed in U.S. Pat. No. 5,419,283). It should be recognized that this invention contemplates both partially consumable toys (e.g., toys comprising plastic components) and fully consumable toys (e.g., rawhides and various artificial bones). It should be further recognized that this invention contemplates toys for both human and non-human use, particularly for companion, farm, and zoo animal use, and particularly for cat, dog, or rabbit use.

Preparation of the Compositions of the Invention

The compositions of the invention, which are to be administered to animals in need of the methods disclosed herein, may be prepared as food products suitable for consumption by the animals. These food products may be of any consistency or moisture content; i.e., the compositions of the present invention may be moist, semi-moist, or dry food products. "Moist" food products are generally those with a moisture content of from 60% to 90% or greater. "Dry" food products are generally those with a moisture content of from 3% to 11%, and are often manufactured in the form of small pieces or kibbles. "Semi-moist" food products generally have a moisture content of from 25% to 35%. The food products of the present invention may also include components of more than one consistency, for example, soft, chewy meat-like particles or pieces as well as kibble having an outer cereal component or coating and an inner "cream" component, e.g., as described in U.S. Pat. No. 6,517,877.

In certain embodiments, the food products may be prepared in a canned or wet form using conventional food preparation processes known to those of ordinary skill in the art. Typically, ground animal proteinaceous tissues are mixed with the other ingredients, such as cereal grains, suitable carbohydrate sources, fats, oils, and balancing ingredients, including special purpose additives such as vitamin and mineral mixtures, inorganic salts, cellulose, beet pulp and the like, and water in an amount sufficient for processing. The ingredients are mixed in a vessel suitable for heating while blending the components. Heating the mixture is carried out using any suitable manner, for example, direct steam injection or using a vessel fitted with a heat exchanger. Following addition of all of the ingredients of the formulation, the mixture is heated to a temperature of from 50° F. to 212° F. Although temperatures outside this range can be used, they may be commercially-impractical without the use of other processing aids. When heated to the appropriate temperature, the material will typically be in the form of thick liquid, which is dispensed into cans. A lid is applied and the container is hermetically sealed. The sealed can is then placed in convention equipment designed for sterilization of the contents. Sterilization is usually accomplished by heating to temperatures of greater than 230° C. for an appropriate time depending on the temperature used, the nature of the composition, and related factors. The compositions and food products of the present invention can also be added to or combined with food compositions before, during, or after their preparation, provided the resulting mixture contains less than or equal to 0.74% calcium by dry weight of the composition, less than or equal to 0.69% phosphorous by dry weight of the composition; and less than or equal to 0.28% sodium by dry weight of the composition.

In other embodiments, the ingredients of the composition are adjusted so as to contain from 0.1%, from 0.2%, from 0.3%, from 0.4%, from 0.5%, or from 0.6% to less than or equal to 0.74% calcium by dry weight of the composition; from 0.1%, from 0.2%, from 0.3%, from 0.4%, from 0.5%, or from 0.6% to less than or equal to 0.69% phosphorous by dry weight of the composition, and from 0.05%, from 0.10%, from 0.15%, from 0.2%, of from 0.25% to less than or equal to 0.28% sodium by dry weight of the composition In other embodiments, the food products may be prepared in a dry form using convention processes known to those of ordinary skill in the art. Typically, dry ingredients, including dried animal protein, plant protein, grains and the like are ground and mixed together. Liquid or moist ingredients, including fats, oils water, animal protein, water, and the like are added combined with the dry materials. The specific formulation, order of addition, combination, and methods and equipment used to combine the various ingredients can be selected from those known in the art. For example, in certain embodiments, the resulting mixture is process into kibbles or similar dry pieces, which are formed using an extrusion process in which the mixture of dry and wet ingredients is subjected to mechanical work at high pressure and temperature, forced through small openings or apertures, and cut off into the kibbles, e.g., with a rotating knife.

The resulting kibble can be dried and optionally coated with one or more topical coatings comprising, e.g., flavors, fats, oils, powdered ingredients, and the like. Kibbles may also be prepared from dough by baking, rather than extrusion, in which the dough is placed into a mold before dry-heat processing.

In preparing a composition for use with the methods of the present invention, any ingredient generally may be incorporated into the composition during the processing of the formulation, e.g., during and/or after mixing of the other components of the composition. Distribution of these components into the composition can be accomplished by conventional means. In certain embodiments, ground animal and/or poultry proteinaceous tissues are mixed with other ingredients, including nutritional balancing agents, inorganic salts, and may further include cellulose, beet pulp, bulking agents and the like, along with sufficient water for processing.

In particular embodiments, the compositions are formulated so as to be easier to chew. In specific embodiments, the compositions and food products are formulated to address specific nutritional differences between species and breeds of animals, as well as one of more of the attributes of the animal. For example, canine and feline foods, for example, are typically formulated based upon the life stage, age, size, weight, body composition, and breed.

Accordingly, in one specific embodiment, the present invention is directed to a method for preparing a food product, the method comprising, admixing suitable sources of protein, fat, carbohydrate, minerals, and vitamins, and processing the mixture to provide the food product, to provide a food product suitable for consumption by an animal, e.g., a companion animal such a feline or canine companion animal, in which the food product comprises from 0.60% to 0.74% calcium by dry weight of the food product, from 0.50% to 0.69% phosphorous by dry weight of the food product, and from 0.06% to 0.28% sodium by dry weight of the food product.

EXAMPLE

The invention is further described in the following Example, which is merely illustrative and does not in any way limit the scope of the invention as described and claim. Hairball Control in Felines by Limitation of Dietary Minerals Eighteen cats, previously identified as hairball formers, were enrolled in the present study. Of these, one cat was removed from the trial after seven weeks, while the remaining seventeen cats were able to complete the entire study.

The study included four temporal segments, which were designated the "pre-testing" (two weeks), "Period 1," "transition," and "Period 2." In the first, all cats were fed an adult feline diet for two weeks, as a "pre-testing" or "wash-out" diet. This formulation included poultry by-products, corn and corn-derived ingredients, fat, vitamins and minerals. After this initial segment, the cats were divided into two groups.

The cats of the first group ("Group I") were fed an Experimental formulation and the cats of the second group ("Group II") were fed a Control or Previous formulation, each for a total of eight weeks ("Period 1"). The compositions of the Experimental and Control or Previous formulations are provided in Table 1:

TABLE 1

(All values expressed as % by weight of the Diet)

| Ingredient | Control Diet | Experimental Diet |
| --- | --- | --- |
| Total Calcium | 0.95 | 0.74 |
| Total Phosphorous | 0.86 | 0.69 |
| Total Sodium | 0.54 | 0.28 |

Upon completion of this eight-week segment ("Period 1"), all of the animals were again fed the adult feline diet noted above ("wash-out" diet) for a two week "transition" period.

Upon completion of the two week "transition" period cats of the first group ("Group I") were fed the Control or Previous formulation and the cats of the second group ("Group II") were fed the Experimental formulation, each for a total of eight weeks ("Period 2").

The number of hairballs deposited was recorded for each of the cats in the study and was scored weekly. These data are presented in Table 2, below.

TABLE 2

(Total number of hairballs observed with each diet within each temporal segment)

| Diet | Group 1 | Group 2 | Total (Group 1 + Group 2) |
| --- | --- | --- | --- |
| Wash-out Diet (Pre-testing period) | 10 | 7 | 17 |
| Wash-out Diet (Transition period) | 8 | 9 | 17 |
| Control Diet | 63 | 88 | 151 |
| Experimental Diet (Low Ca, P, and Na) | 40 | 41 | 81 |

Table 2 provides the number of hairballs observed for each group of cats during each time segment. As noted above, Group 1 included 8 cats and Group 2 included 9 cats. As also noted above the Standard Diet was administered for the Pre-Feeding and Transition periods, both of which lasted two weeks, while the Control and Experimental Diets were each fed for an eight week period. The data of Table 2 illustrate that feeding the experimental diet, with the indicated lower levels of calcium, phosphorous, and sodium resulted in substantial decrease in hairball formation, from a total of 151 with the Control or Previous Diet to only 81 with the Experimental Diet over the eight-week testing periods, i.e., a decrease of more than 45%.

While the invention has been described in detail and with reference to specific examples thereof, it would be apparent to one skilled in the art that various changes and modification can be made therein without departing from the spirit and scope thereof.

As used throughout, ranges are used as shorthand for describing each and every value that is within the range. Any value within the range can be selected as the terminus of the range. In addition, all references cited herein are hereby incorporated by referenced in their entireties. In the event of a conflict in a definition in the present disclosure and that of a cited reference, the present disclosure controls.

Unless otherwise specified, all percentages and amounts expressed herein and elsewhere in the specification should be understood to refer to percentages by weight. The amounts given are based on the active weight of the material.

What is claimed is:

1. A method for reducing hairball formation in an animal in need thereof, the method comprising feeding the animal in need thereof a composition comprising:

less than or equal to 0.74% calcium by dry weight of the composition;

less than or equal to 0.69% phosphorous by dry weight of the composition; and less than or equal to 0.28% sodium by dry weight of the composition;

wherein the composition is a nutritionally complete diet, wherein the composition is administered in an amount and for a time sufficient for reducing the frequency of hairball discharge by the animal, and wherein the animal in need thereof is fed a previous diet comprising 0.95% calcium by dry weight of the previous diet, 0.86% phosphorus by dry weight of the previous diet, and 0.54% sodium by dry weight of the previous diet.

2. The method of claim 1, wherein the animal in need thereof is fed the previous diet for eight weeks, and wherein the animal in need thereof is fed the composition for eight weeks.

3. The method of claim 2, wherein the composition comprises:

0.74% calcium by dry weight of the composition;

0.69% phosphorus by dry weight of the composition; and 0.28% sodium by dry weight of the composition.

4. The method of claim 1, wherein the animal is a feline.

5. A method for reducing hairball formation in an animal in need thereof, the method comprising feeding the animal in need thereof a composition comprising:

less than or equal to 0.74% calcium by dry weight of the composition;

less than or equal to 0.69% phosphorous by dry weight of the composition; and less than or equal to 0.28% sodium by dry weight of the composition;

wherein the composition is administered in an amount and for a time sufficient for reducing the frequency of hairball discharge by the animal, wherein the animal is a feline, wherein the animal in need thereof is fed a previous diet comprising 0.95% calcium by dry weight of the previous diet, 0.86% phosphorus by dry weight of the previous diet, and 0.54% sodium by dry weight of the previous diet, and wherein the composition is a nutritionally complete diet.

6. The method of claim 5, wherein the composition comprises:

0.74% calcium by dry weight of the composition;

0.69% phosphorus by dry weight of the composition; and 0.28% sodium by dry weight of the composition.

7. The method of claim 6, wherein the animal in need thereof is fed the composition for eight weeks.

* * * * *